(12) United States Patent
Matsuura et al.

(10) Patent No.: US 10,479,872 B2
(45) Date of Patent: Nov. 19, 2019

(54) ANTIFOGGING FILM

(71) Applicant: FUJIFILM Corporation, Tokyo (JP)

(72) Inventors: Yui Matsuura, Kanagawa (JP); Syougo Katano, Kanagawa (JP); Toshiya Mita, Kanagawa (JP); Akihiro Ikeyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 130 days.

(21) Appl. No.: 15/919,724

(22) Filed: Mar. 13, 2018

(65) Prior Publication Data

US 2018/0201745 A1    Jul. 19, 2018

Related U.S. Application Data

(63) Continuation of application No. PCT/JP2016/075946, filed on Sep. 5, 2016.

(30) Foreign Application Priority Data

Sep. 14, 2015  (JP) ................ 2015-180718
Apr. 26, 2016  (JP) ................ 2016-087749

(51) Int. Cl.
| | |
|---|---|
| *C08J 5/18* | (2006.01) |
| *C08L 1/10* | (2006.01) |
| *C09K 3/18* | (2006.01) |
| *C08B 3/16* | (2006.01) |
| *C08B 3/24* | (2006.01) |
| *C08L 67/02* | (2006.01) |

(52) U.S. Cl.
CPC ............ *C08J 5/18* (2013.01); *C08B 3/16* (2013.01); *C08L 1/10* (2013.01); *C08L 67/02* (2013.01); *C09K 3/18* (2013.01); *C08J 2301/10* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 2004/0052977 A1 | 3/2004 | Ogawa et al. | |
| 2006/0004192 A1* | 1/2006 | Oya ................ | C08B 3/00 536/58 |
| 2006/0269768 A1 | 11/2006 | Mutou et al. | |

FOREIGN PATENT DOCUMENTS

| | | |
|---|---|---|
| JP | H05-184244 A | 7/1993 |
| JP | H07-62120 A | 3/1995 |
| JP | 2006-328184 A | 12/2006 |
| JP | 2008-214544 A | 9/2008 |
| JP | 2012-145632 A | 8/2012 |
| JP | 2013-099879 A | 5/2013 |
| JP | 2013-100401 A | 5/2013 |
| JP | 2014-198035 A | 10/2014 |
| JP | 2014-224213 A | 12/2014 |
| WO | 2002/46809 A1 | 6/2002 |

OTHER PUBLICATIONS

International Search Report issued in PCT/JP2016/075946 dated Nov. 22, 2016.
Written Opinion issued in PCT/JP2016/075946 dated Nov. 22, 2016.
International Preliminary Report on Patentability issued by WIPO dated Mar. 20, 2018, in connection with International Patent Application No. PCT/JP2016/075946.

* cited by examiner

*Primary Examiner* — Sheeba Ahmed
(74) *Attorney, Agent, or Firm* — Edwards Neils LLC; Jean C. Edwards, Esq.

(57) ABSTRACT

An antifogging film includes a film base and a saponified layer. The film base is formed of cellulose triacetate as cellulose acylate. The saponified layer is provided on a first base surface of the film base and serves as a first film surface of the antifogging film. The saponified layer contains saponified cellulose triacetate. The antifogging film is configured such that the first film surface has a contact angle of 20° or less 15 seconds after dropping of pure water thereto. In a case where the amount of acyl groups of the first film surface is X and the amount of acyl groups of a second base surface is Y, an acyl group ratio obtained by X/Y is 0.7 or less.

9 Claims, 3 Drawing Sheets

ANTIFOGGING FILM

CROSS-REFERENCE TO RELATED APPLICATIONS

This application is a Continuation of PCT International Application No. PCT/JP2016/075946 filed on 5 Sep. 2016, which was published under PCT Article 21(2) in Japanese, and which claims priority under 35 U.S.C § 119(a) to Japanese Patent Applications No. 2015-180718 filed on 14 Sep. 2015 and No. 2016-087749 filed on 26 Apr. 2016. The above applications are hereby expressly incorporated by reference, in their entirety, into the present application.

BACKGROUND OF THE INVENTION

1. Field of the Invention

The present invention relates to an antifogging film.

2. Description of the Related Art

The visibility of mirrors for bathrooms and washstands, refrigerator showcases, glasses, and the like is deteriorated by water droplets adhering to the surface due to dew condensation. Here, in order to suppress deterioration in visibility, an antifogging film is used. As the antifogging film, a cellulose acylate film of which at least one film surface is subjected to a hydrophilic treatment may be used. As the hydrophilic treatment, there are actinic ray irradiation, a plasma treatment, a saponification treatment with alkali, and the like.

For example, JP2014-224213A discloses an antifogging film obtained by performing any one hydrophilic treatment of actinic ray irradiation, a plasma treatment, a corona discharge treatment, and the like as a hydrophilic treatment for a cellulose acylate film. The antifogging film includes a methylene chloride soluble layer and a methylene chloride insoluble layer. The methylene chloride insoluble layer is an antifogging layer.

An antifogging film disclosed in JP2013-99879A is obtained by performing a saponification treatment as a hydrophilic treatment. This antifogging film includes a cellulose acylate layer, and an antifogging layer containing saponified cellulose acylate, and the thickness d(C) of the antifogging layer and thickness d(T) of the antifogging film satisfy Expressions (1) and (2). The antifogging film contains a plasticizer and as the plasticizer, triphenyl phosphate and ester are mentioned. As the ester, a polyester polyol having a number average molecular weight of 300 to 3,000, and a terminal blocked polyester having a number average molecular weight of 300 to 1,500 are mentioned.

$$0.030 \leq d(C)/d(T) \leq 0.250 \quad \text{Expression (1)}$$

$$10 \ \mu m \leq d(T) \leq 90 \ \mu m \quad \text{Expression (2)}$$

In addition, JP2012-145632A discloses an antifogging film obtained by performing a saponification treatment. This antifogging film has a contact angle of 50° or less 60 seconds after dropping of pure water droplets to a saponified film surface.

SUMMARY OF THE INVENTION

The antifogging films disclosed in JP2013-99879A and JP2012-145632A have excellent initial antifogging properties which are a function of preventing instantaneous dew condensation. However, the antifogging films disclosed in JP2013-99879A and JP2012-145632A do not have long-term antifogging properties, that is, a function of preventing dew condensation for a long period of time, and the applications thereof are limited. In addition, an antifogging film disclosed in JP2014-224213A also does not have long-term antifogging properties.

An object of the present invention is to provide an antifogging film having initial antifogging properties and long-term antifogging properties.

In order to achieve the above object, according to the present invention, there is provided an antifogging film comprising: a film base which is formed of cellulose acylate; and a saponified layer which is provided on one base surface of the film base, serves as one film surface, and contains saponified cellulose acylate. The antifogging film is configured such that a contact angle 15 seconds after dropping of pure water to the one film surface is of 20° or less, and in a case where an amount of acyl groups of the one film surface is X and an amount of acyl groups of the other base surface of the film base is Y, an acyl group ratio obtained by X/Y is 0.7 or less.

It is preferable that the amount of acyl groups X and the amount of acyl groups Y are obtained by an attenuated total reflection measurement method of Fourier transform infrared spectroscopy. It is preferable that the contact angle is obtained by dropping pure water to the one film surface after adjusting humidity of the saponified layer in an atmosphere at a temperature in a range of 23° C. or higher and 28° C. or lower and a relative humidity in a range of 55% or more and 65% or less.

It is preferable that the film base includes an ester oligomer having a repeating unit including an ester bond of dicarboxylic acid and diol and having a molecular weight in a range of 500 or more and 10,000 or less, as a plasticizer. It is preferable that the dicarboxylic acid is an aliphatic dicarboxylic acid having 2 to 10 carbon atoms, and the diol is an aliphatic diol having 2 to 10 carbon atoms.

It is preferable that a thickness of the saponified layer is in a range of 1 μm or more and 6 μm or less.

It is preferable that an amount of C=O groups of acyl groups bonded to hydroxy group components of a cellulose group in a depth range of 2 μm from the one film surface is 70% or less with respect to an amount of C=O groups of acyl groups bonded to hydroxy group components of a cellulose group in the other base surface of the film base.

It is preferable that the saponified layer is a layer formed by subjecting a cellulose acylate film to a saponification treatment, and the film base is a remaining portion of the cellulose acylate film excluding the saponified layer.

The antifogging film of the present invention has excellent initial antifogging properties and long-term antifogging properties.

DESCRIPTION OF THE PREFERRED EMBODIMENTS

Figure 1:
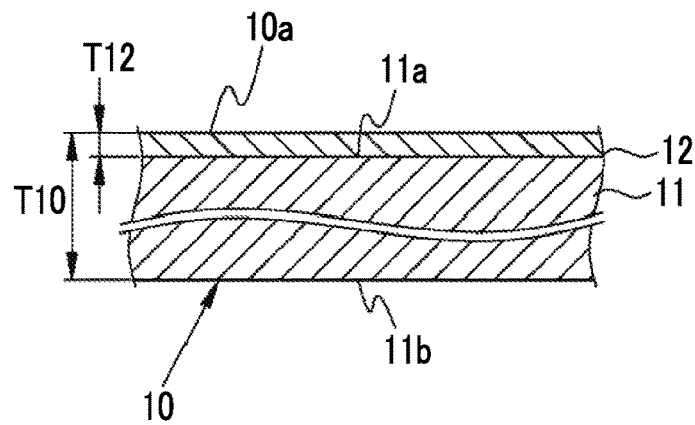
FIG. 1 is a cross-sectional schematic view of an antifogging film in which the present invention is implemented.

As shown in FIG. 1, an antifogging film 10 includes a film base 11, and a saponified layer 12. A thickness T10 of the antifogging film 10 is not particularly limited and for example, the thickness is set to be in a range of 10 μm or more and 200 μm or less. In the embodiment, the thickness T10 is set to, for example, 40 μm.

The film base 11 is a film main body of the antifogging film 10 and also functions as a support for supporting the saponified layer 12. The film base 11 is formed of cellulose acylate. In the embodiment, cellulose acylate is cellulose triacetate (triacetylcellulose, hereinafter, referred to as TAC) but is not limited to TAC. Other cellulose acylates different from TAC may be used. The film base 11 does not contain saponified cellulose acylate.

The cellulose acylate will be described in detail below. In the cellulose acylate, it is particularly preferable that a ratio of esterification of hydroxy groups of cellulose with carboxylic acid, that is, a degree of substitution of acyl groups (hereinafter, also referred to as acyl group substitution degree) satisfies all conditions of Expressions (1) to (3). In Expressions (1) to (3), A and B are both acyl group substitution degrees, the acyl group of A is an acetyl group, and the acyl group of B has 3 to 22 carbon atoms.

$$2.4 \leq A+B \leq 3.0 \tag{1}$$

$$0 \leq A \leq 3.0 \tag{2}$$

$$0 \leq B \leq 2.9 \tag{3}$$

A glucose unit, which constitutes cellulose and forms a β-1,4 bond, has hydroxy groups at the 2-position, 3-position and 6-position. The cellulose acylate is a polymer obtained by esterifying a part or all of these hydroxy groups and thus substituting hydrogen of the hydroxy groups with an acyl group having 2 or more carbon atoms. In a case where one hydroxy group in the glucose unit is 100% esterified, the substitution degree becomes 1. Therefore, in a case of the cellulose acylate, each of the hydroxy groups at the 2-position, 3-position and 6-position is 100% esterified and the substitution degree becomes 3.

Here, in a case where the acyl group substitution degree at the 2-position of the glucose unit is DS2, the acyl group substitution degree at the 3-position is DS3, and the acyl group substitution degree at the 6-position is DS6, a total acyl group substitution degree obtained by "DS2+DS3+DS6" is preferably 2.00 to 3.00 and is 2.86 in the embodiment.

The acyl group may be only a single kind, or two or more kinds of acyl groups may be used. In a case where two or more kinds of acyl groups are used, one of these acyl groups is preferably an acetyl group. In a case where the total sum of substitution degrees of hydrogen in the hydroxy groups at the 2-position, 3-position and 6-position with an acetyl group is defined as DSA and the total sum of substitution degrees of hydrogen in the hydroxy groups at the 2-position, 3-position and 6-position with an acyl group other than the acetyl group is defined as DSB, it is preferable that a value of "DSA+DSB" is 2.2 to 2.86 and particularly preferably 2.40 to 2.80. The DSB is preferably 1.50 or more and particularly preferably 1.7 or more. In the DSB, the percentage of the substituent for the hydroxy group at the 6-position is preferably 28% or higher, more preferably 30% or higher, even more preferably 31% or higher, and particularly preferably 32% or higher. In addition, the value of (DSA+DSB) at the 6-position of the cellulose acylate is preferably 0.75 or more, more preferably 0.80 or more, and particularly preferably 0.85 or more.

The acyl group having 2 or more carbon atoms may be an aliphatic group or an aryl group and is not particularly limited. Examples thereof include alkylcarbonyl esters, alkenylcarbonyl esters or aromatic carbonyl esters and aromatic alkylcarbonyl esters of cellulose, and each of these cellulose esters may have a further substituted group. Preferable substituents are a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexanecarbonyl group, an oleoyl group, a benzoyl group, a naphthylcarbonyl group, a cinnamoyl group, and the like. Among these, a propionyl group, a butanoyl group, a dodecanoyl group, an octadecanoyl group, a t-butanoyl group, an oleoyl group, a benzoyl group, a naphthylcarbonyl group, a cinnamoyl group, and the like are more preferable, and a propionyl group and a butanoyl group are particularly preferable.

The film base 11 may include, in addition to the cellulose acylate, various additives such as a plasticizer, an ultraviolet absorbent, and a deterioration preventing agent, and/or, for example, fine particles for preventing adhesion between the antifogging films 10.

In the film base 11, it is preferable that the mass of a plasticizer having a molecular weight of less than 500 is suppressed to at most 4%, that is, 4% or less with respect to the mass of the cellulose acylate of the film base 11. That is, in a case where the mass of the cellulose acylate in the film base 11 is MA and the mass of the plasticizer having a molecular weight of less than 500 in the film base 11 is MB, a mass ratio (unit:%) obtained by (MB/MA)×100 is 4% or less in the film base 11. By setting the mass ratio to 4% or less, compared to a case of a mass ratio of more than 4%, the plasticizer having a molecular weight of less than 500 is prevented from being precipitated to one film surface 10a (hereinafter, referred to as a first film surface) on the saponified layer 12 side, and long-term antifogging properties are more reliably exhibited. The film base 11 is the remaining portion which is not saponified by a saponification treatment of a cellulose acylate film as described later and thus has the same composition as a cellulose acylate film which becomes the material for the antifogging film 10. The plasticizer having a molecular weight of less than 500 inhibits a reduction in the acyl group ratio in the saponification treatment, which will be described later, increases the contact angle of the first film surface 10a after 15 seconds, and the like. However, in the cellulose acylate film, by keeping the mass ratio (unit:%) obtained by (MB/MA)×100 as small as 4% or less, compared to a case where the mass ratio is more than 4%, a reduction in the acyl group ratio by the saponification treatment and a reduction in the contact angle after 15 seconds are more reliably achieved. The contact angle after 15 seconds is a contact angle 15 seconds after dropping of pure water. The mass ratio in the film base 11 is more preferably in a range of 0% or more and 3% or less and even more preferably in a range of 0% or more and 2% or less. The smaller the mass ratio is, the more preferable it is. The molecular weight is a molecular weight that can be determined by general molecular weight determination methods for chemical substances, such as element analysis, liquid chromatography, gas chromatography, nuclear magnetic resonance (NMR), and infrared spectroscopy (IR), and is obtained by comparison with a standard substance by gas chromatography in the embodiment. Examples of the plasticizer having a molecular weight of less than 500 include triphenyl phosphate (TPP) and biphenyl diphenyl phosphate (BDP).

It is preferable that the film base 11 includes an ester oligomer having a repeating unit including an ester bond of dicarboxylic acid and diol and having a molecular weight in a range of 500 or more and 10,000 or less, as a plasticizer, and the film base 11 of the embodiment also includes this ester oligomer. Since the molecular weight distribution of the ester oligomer is different from the molecular weight distribution of the above-described plasticizer having a molecular weight of less than 500, the molecular weight can be obtained using weight-average molecular weight and number average molecular weight by gel permeation chromatography (GPC), number average molecular weight measurement methods by terminal functional group amount measurement and osmotic pressure measurement, viscosity average molecular weight by viscosity measurement, and the like. In the embodiment, the molecular weight is obtained by a number average molecular weight measurement method by terminal functional group amount measurement. By using the ester oligomer having a molecular weight in a range of 500 or more and 10,000 or less as a plasticizer, in a case of attaching the antifogging film 10 to an attaching target, for example, glass or a mirror, the so-called handleability of the antifogging film 10, such as ease of attachment and ease of reattachment, is reliably improved. In addition, by using the ester oligomer as a plasticizer, compared to a case of using a general plasticizer monomer having a molecular weight of less than 500, precipitation in the first film surface 10a is more reliably suppressed and the contact angle of the first film surface 10a after 15 seconds is easily reduced, thereby more reliably exhibiting long-term antifogging properties. As the molecular weight of the ester oligomer increases, long-term antifogging properties are improved, and as the molecular weight of the ester oligomer decreases, the compatibility with the cellulose acylate are improved. Thus, the molecular weight of the ester oligomer is more preferable in a molecular weight range of 700 or more and 5,000 or less and even more preferably in a range of 900 or more and 3,000 or less.

The dicarboxylic acid is more preferably an aliphatic dicarboxylic acid having 2 to 10 carbon atoms. The diol is more preferably an aliphatic diol having 2 to 10 carbon atoms. This is because the use of an aliphatic dicarboxylic acid and an aliphatic diol makes it possible to impart flexibility to the antifogging film 10 and decomposed substances which inhibit a reduction in the contact angle after 15 seconds, which will be described later, are not easily formed. Examples of the aliphatic dicarboxylic acid include malonic acid, succinic acid, glutaric acid, adipic acid, sebacic acid, azelaic acid, cyclohexanedicarboxylic acid, maleic acid, and fumaric acid. Examples of the aliphatic diol include ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 1,4-hexanediol, 1,4-cyclohexanediol, and 1,4-cyclohexane dimethanol. In the embodiment, as ester, an ester oligomer from adipic acid and ethanediol (having a number average molecular weight of about 1,000 obtained by a method for quantitative determination of terminal hydroxyl groups) is used.

The saponified layer 12 has an initial antifogging function and a long-term antifogging function. The saponified layer 12 is provided on one base surface 11a of the film base 11 (hereinafter, referred to as a first base surface) and serves as the first film surface 10a. The saponified layer 12 includes saponified cellulose acylate, in this case, saponified TAC.

In a case where the amount of acyl groups of the first film surface 10a is X and the amount of acyl groups of the other base surface 11b of the film base 11 (hereinafter, referred to as a second base surface) is Y, an acyl group ratio obtained by X/Y is 0.7 or less and is, for example, 0.3 in the embodiment. As the acyl group ratio decreases, the amount of acyl groups of the first film surface 10a with respect to the second base surface 11b is reduced, which means that more acyl groups are saponified and become hydrophilic groups in the saponification treatment of the cellulose acylate film.

Figure 2A:
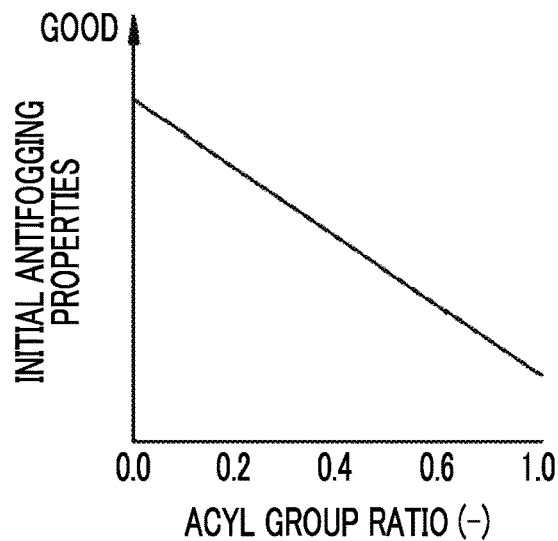
FIG. 2A is a graph showing a relationship between initial antifogging properties and an acyl group ratio.

The acyl group ratio is related to initial antifogging properties. Specifically, as shown in FIG. 2A, as the acyl group ratio decreases, initial antifogging properties are improved. As shown in FIG. 2A, in a graph in which the vertical axis represents initial antifogging properties and the horizontal axis represents an acyl group ratio, a relationship between the initial antifogging properties and the acyl group is substantially linear. In a case where the acyl group ratio is 0.7 or less, that is, in a range of 0 or more and 0.7 or less, compared to a case where the acyl group ratio is more than 0.7, excellent initial antifogging properties are exhibited. The acyl group ratio is more preferably in a range of 0.01 or more and 0.6 or less and even more preferably in a range of 0.05 or more and 0.5 or less.

The amount of acyl groups X and the amount of acyl groups Y are obtained as acyl group spectrum intensities which are obtained by an attenuated total reflection (ATR) method (hereinafter, referred to as an ATR method) of Fourier transform infrared spectroscopy (FT-IR, hereinafter, referred to as FT-IR). Specifically, the spectrum intensity of the signal of the acyl group of the cellulose acylate is corrected (standardized) with the common signal spectrum intensity of a cellulose-based polymer. In the embodiment, since TAC is used as the cellulose acylate, the acyl group is an acetyl group and the signal of the acetyl group is 1,210 $cm^{-1}$. It is preferable that the common signal of a cellulose-based polymer is 1,030 $cm^{-1}$. Then, the spectrum intensities of the signals of the acyl groups of the cellulose acylate obtained by correction are obtained as the amount of acyl groups X and the amount of acyl groups Y. Thus, the amount of acyl groups X and the amount of acyl groups Y are indexes which are replaced by the number of acyl groups.

The ATR method of FT-IR is a method of obtaining a spectrum intensity by allowing light to penetrate through a measurement sample, as already known, and the obtained spectrum intensity is not the one measured at the surface of the measurement sample in a strict sense. In a case of performing measurement at a measurement angle of 45 degrees using a diamond prism as one method in the ATR method of general FT-IR, the penetration depth of light from the surface of the measurement sample is about 2 to 3 μm. Since the saponified layer 12 of the embodiment is very thin as described later, as the penetration depth of light becomes larger than 2 μm, reliability as the amount of acyl groups obtained for the saponified layer 12 is low. The spectrum intensity in a depth range of 2 μm from the first film surface 10a is preferably obtained as the amount of acyl groups X. Also, in the embodiment, the penetration depth of light is set to 2 μm and the spectrum intensity in a depth range of 2 μm or less from the first film surface 10a is set to the amount of acyl groups X.

In the same manner, the spectrum intensity in a depth range of 2 μm from the second base surface 11b is preferably obtained as the amount of acyl groups Y and the same is also applied in the embodiment. In a case where the saponified layer is also provided on the second base surface 11b, it is preferable that the amount of acyl groups at the center of the film base 11 in the thickness direction is obtained and this obtained value is used as the amount of acyl groups Y from the viewpoints of simplicity and reliability as the amount of acyl groups obtained for the film base 11. In a case where it is difficult to obtain the amount of acyl groups Y in the second base surface 11b in the above-described manner, the amount of acyl groups may be obtained by another method in which the antifogging film 10 is dissolved in methylene chloride and/or chloroform, and the like, a film is formed from this solution, and the amount of acyl groups in the film surface of this film is obtained by IR, and the like.

Figure 2B:
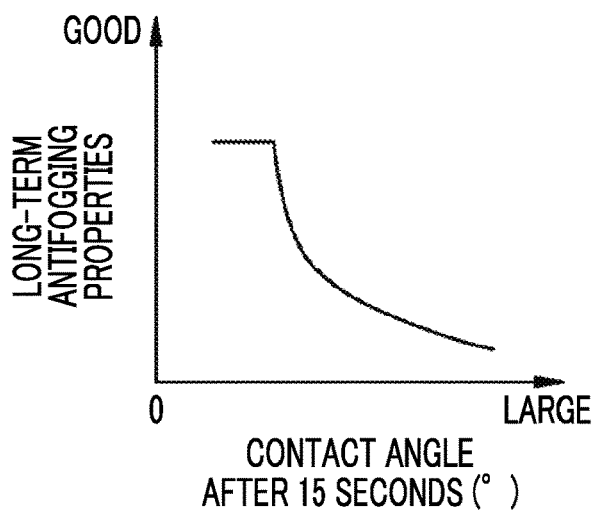
FIG. 2B is a graph showing a relationship between long-term antifogging properties and a contact angle 15 seconds after dropping of pure water.

The contact angle after 15 seconds is related to long-term antifogging properties. Specifically, as shown in FIG. 2B, in a case where the contact angle is smaller than 20 degrees, particularly, long-term antifogging properties tends to be improved. More specifically, long-term antifogging properties are rapidly improved at a point where a contact angle after 15 seconds becomes 20 degrees or less and the long-term antifogging properties tend to be improved at a contact angle of 20 degree or less. The contact angle after 15 seconds is the characteristic showing that a sufficient amount of hydrophilic components is present on the first film surface 10a and in such a case where a large amount of hydrophilic components is present on the first film surface 10a, a state in which condensed water droplets sufficiently wet-spread on the first film surface 10a can be maintained and thus this case is considered to be effective on long-term antifogging properties. In the first film surface 10a, the contact angle after 15 seconds is 20° or less and in the embodiment, for example, the contact angle after 15 seconds is 13°. The contact angle after 15 seconds is related to long-term antifogging properties. However, in order to set the contact angle after 15 seconds to 20° or less, the amount of acyl groups X of the first film surface 10a is controlled such that the acyl group ratio is 0.7 or less. The contact angle after 15 seconds is preferably in a range of 5° or more and 20° or less, more preferably in a range of 8° or more and 20° or less, and even more preferably in a range of 10° or more and 18° or less. The contact angle is obtained in consideration of time after pure water is dropped and the time is set to after 15 seconds. Thus, a contact angle after 15 seconds is obtained. Thus, the antifogging film 10 having excellent long-term antifogging properties is obtained. The contact angle after 15 seconds is the characteristic showing affinity with water on the film surface. In the measurement of the contact angle with respect to water, it has been found that a phenomenon that pure water is infiltrated into a hydrophilic portion (hereinafter, referred to as a hydrophilic film) formed in a film having a very small thickness on the surface of the saponified layer 12 or the film component comes out from the inside of the hydrophilic film or the like occurs as time elapses after pure water is dropped; however, by performing the measurement in 15 seconds after the drop, the hydrophilicity of the film surface corresponding to long-term antifogging properties can be measured.

The contact angle after 15 seconds is preferably measured with respect to the antifogging film 10 after the humidity is adjusted. The treatment for humidity adjustment is preferably performed under the condition of an atmosphere at a temperature in a range of 23° C. or higher and 28° C. or lower and a relative humidity in a range of 55% or more and 65% or less and the humidity adjusting time is more preferably 1 hour or longer. In the embodiment, humidity adjustment is performed for 1 hour in an atmosphere at a temperature of 25° C. and a relative humidity of 60%. In this humidity adjustment treatment, the humidity of the entire antifogging film 10 may be adjusted but it is sufficient that the humidity of at least the saponified layer 12 is adjusted.

Figure 3:
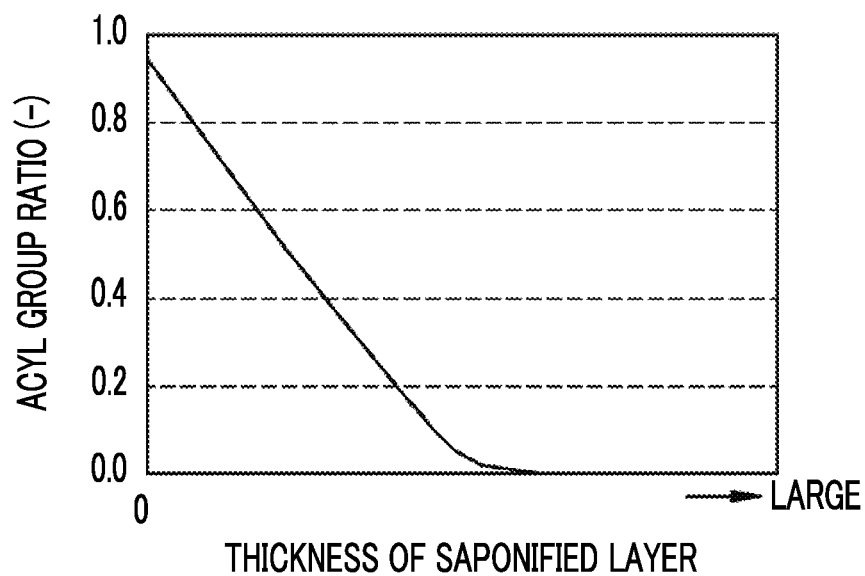
FIG. 3 is a graph showing a relationship between an acyl group ratio and the thickness of a saponified layer.

In addition, by setting a thickness T12 of the saponified layer 12 (refer to FIG. 1) to be in a predetermined range, both initial antifogging properties and long-term antifogging properties are more reliably attained. The details are as follows. The acyl group ratio is correlated with the thickness T12 and as shown in FIG. 3, the thickness T12 increases as the acyl group ratio decreases. Initial antifogging properties are further improved as the acyl group ratio decreases, as described above. Thus, in FIG. 3, it is found that as the thickness T12 increases, initial antifogging properties are further improved.

Figure 4:
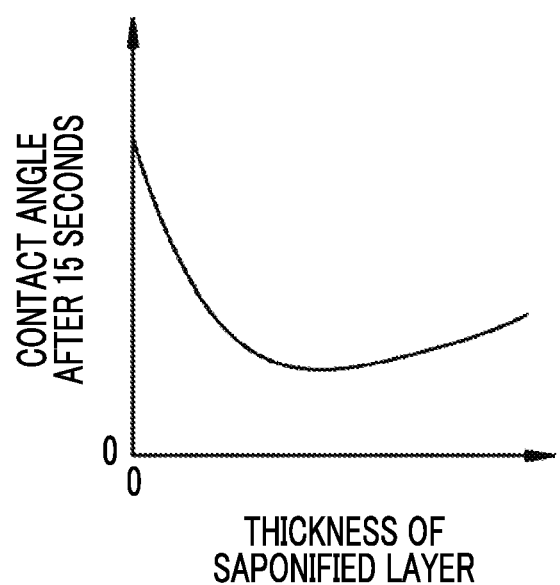
FIG. 4 is a graph showing a relationship between a contact angle 15 seconds after dropping of pure water and the thickness of a saponified layer.

As shown in FIG. 4, as the thickness T12 of the saponified layer 12 is increased from 0 (zero), the contact angle after 15 seconds is gradually reduced, but in a case where the thickness T12 is increased to a certain degree or more, the contact angle after 15 seconds is gradually increased. The gradual increase is caused because in a case where the conditions for saponification described later are strengthened to increase the thickness T12, the above-described hydrophilic film of which the contact angle after 15 seconds is reduced is reduced or a retention region in which water is retained is excessively enlarged due to excessive large thickness T12, so that water is infiltrated into the inside of the first film surface 10a. Since long-term antifogging properties are exhibited at a contact angle after 15 seconds of 20° or less as described above, in a region where the contact angle after 15 seconds is gradually increased shown in FIG. 4, the thickness T12 is preferably set such that the thickness corresponding to 20° is set to an upper limit. Thus, in addition to the initial antifogging properties, long-term antifogging properties are more reliably secured.

Thus, in order to more reliably exhibit initial antifogging properties and long-term antifogging properties, the thickness T12 is preferably in a range of 1 μm or more and 6 μm or less and is in a range of 2 μm or more and 5 μm or less in the embodiment. That is, in a case where the thickness T12 is 1 μm or more, compared to a case where the thickness is less than 1 μm, initial antifogging properties are more reliably exhibited and in a case where the thickness is 6 μm or less, compared to a case where the thickness is larger than 6 μm, long-term antifogging properties are more reliably exhibited.

The thickness T12 is obtained by the following manner in the embodiment. A sample sampled from the antifogging film 10 is immersed in dichloromethane for 24 hours. The undissolved sample in the immersion is dried and the thickness of the dried sample is measured 3 times. The average value of the three measurement values is used as the thickness T12.

In the antifogging film 10, the amount of C=O (carboxyl groups) of acyl groups bonded to hydroxyl group components of cellulose in a dept range of 2 μm from the first film surface 10a is preferably 70% or less with respect to the amount of C=O of acyl groups bonded to hydroxyl group components of cellulose in the second base surface 11b, and is set to be in a range of 30% or more and 70% or less with respect to the amount of C=O of acyl groups bonded to hydroxyl group components of cellulose in the second base surface in the embodiment. For example, in a case where the acyl group ratio is not obtained, the contact angle after 15 seconds is set to 20° or less and the amount of C=O of the acyl groups bonded to the hydroxyl group components of the cellulose in a dept range of 2 μm from the first film surface 10*a* is set to 70% or less with respect to the amount of C=O of the acyl groups bonded to the hydroxyl group components of the cellulose in the second base surface 11*b*, thereby exhibiting initial antifogging properties and long-term antifogging properties.

The antifogging film 10 is produced in a long shape in the embodiment and, for example, a pressure sensitive adhesive layer is provided on the second base surface 11*b*. The antifogging film is cut into sheets of a desired size and is provided for use. The pressure sensitive adhesive layer is provided for attaching the antifogging film 10 to an attaching target. In the antifogging film 10 of the example, the saponified layer 12 is provided on only the first base surface 11*a* of the film base 11. However, there is no limitation thereto. That is, the saponified layer 12 may be provided on the second base surface 11*b* in addition to the first base surface 11*a*. In this case, the pressure sensitive adhesive layer is provided on any one of the saponified layer 12 on the first base surface 11*a* and the saponified layer on the second base surface 11*b* in a layered manner. In the antifogging film 10, in order to impart lamination suitability and impart strength and the like, a synthetic resin film may be laminated on the second base surface 11*b* side. As the synthetic resin film, a general film such as a polyethylene terephthalate film, a cellulose acylate film, or a polyacrylate film, can be used.

The antifogging film 10 is produced by saponifying a cellulose acylate film. In the embodiment, an alkali solution, as a saponification liquid, is applied to one film surface of the long cellulose acylate film formed by using TAC as cellulose acylate and the coated cellulose acylate film is heated and washed with water, thereby producing the antifogging film 10. Isopropyl alcohol is incorporated into the saponification liquid. The saponified layer 12 is a region formed in a layered state by saponifying cellulose acylate by a saponification treatment by coating and heating. The film base 11 is a non-saponified portion of the cellulose acylate film in which cellulose acylate is not saponified, that is, the remaining portion excluding the saponified layer 12. Accordingly, the above-described amount of acyl groups Y is equal to the amount of acyl groups in an arbitrary range of 2 μm of the cellulose acylate film before saponification in the thickness direction.

The contact angle after 15 seconds, the acyl group ratio, the thickness T12, and the amount of C=O of the acyl groups bonded to the hydroxyl group components of the cellulose in a depth range of 2 μm from the first film surface 10*a* with respect to the amount of C=O of the acyl groups bonded to the hydroxyl groups of the cellulose in the film base 11 can be controlled by increasing or decreasing the amount of isopropyl alcohol and/or the amount of alkali in the saponification liquid. In addition, in the example, the cellulose acylate film is produced by casting a polymer solution (hereinafter, referred to as a dope) containing cellulose acylate to a support to form a cast film, peeling off the cast film from the support, and drying the peeled-off cast film. The kind and the amount of the plasticizer of the film base 11 can be adjusted by the above dope formulation.

The antifogging film 10 can be used as a film for an agricultural greenhouse. The film for an agricultural greenhouse is a film stretched so as to cover a skeleton of a small house called a so-called vinyl house (greenhouse), and is different from an agricultural multifilm, that is, a film used for covering a soil surface to prevent fields (ground surfaces) from drying, to suppress weeds, and the like.

In a case where the antifogging film 10 is used as a film for an agricultural greenhouse, the antifogging film 10 is arranged in a state in which the saponified layer 12 is arranged inside of an agricultural greenhouse. That is, in a state in which the surface which is in contact with the atmosphere in the agricultural greenhouse becomes the first film surface 10*a* (refer to FIG. 1), the antifogging film 10 is used. In the case where the antifogging film is used as the film for an agricultural greenhouse, the thickness T10 (refer to FIG. 1) of the antifogging film 10 is more preferably in a range of 60 μm or more and 200 μm or less, and the thickness T10 of the antifogging film 10 used for agricultural greenhouses 30 and 40 in the following embodiment is set to 40 μm or 120 μm.

Figure 5:
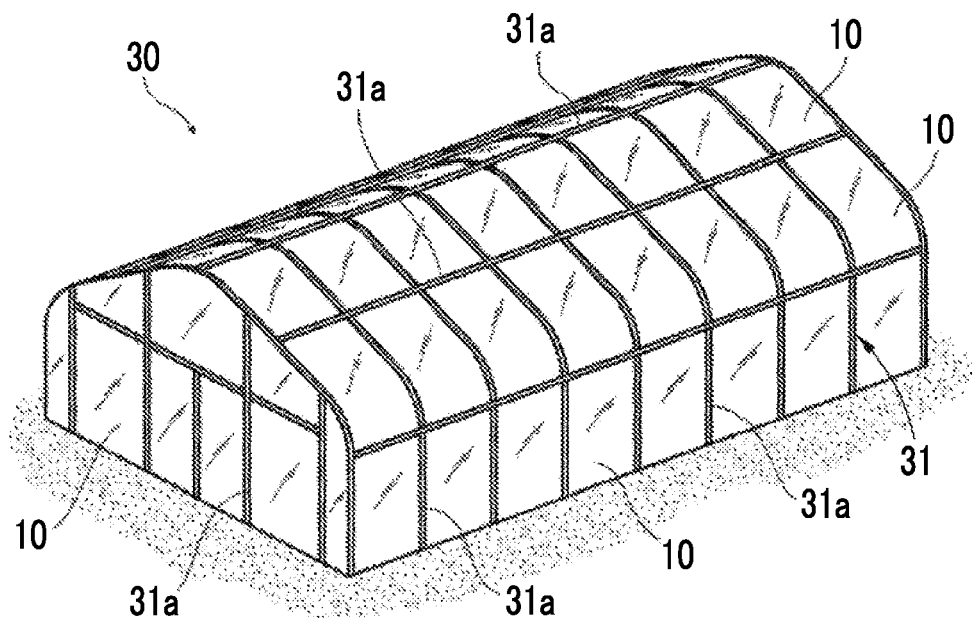
FIG. 5 is a schematic view of an agricultural greenhouse.

In FIG. 5, the agricultural greenhouse 30 includes a skeleton 31 and the antifogging film 10 as a film for an agricultural greenhouse. The skeleton 31 is provided for supporting the antifogging film 10. The skeleton 31 is formed by combining a plurality of aggregates 31*a*. As the aggregates 31*a*, known materials for agricultural greenhouses can be used. For example, steel materials, steel pipes, and the like may be used. The shape of the skeleton 31 is not limited to the example. For example, in the example, a roof portion may be formed in a mountain shape but the shape in a horizontal direction may be flat. Alternately, an inclined shape of which the height is gradually lowered in one direction may be used. The antifogging film 10 is spread on the skeleton 31 and in the embodiment, a plurality of antifogging films 10 are mutually joined in a plane direction. The antifogging film 10 is spread on the skeleton 31 in a state in which the saponified layer 12 (refer to FIG. 1) is directed to the inner side of the agricultural greenhouse 30 and the film base 11 (refer to FIG. 1) is directed to the outer side.

In the agricultural greenhouse 30, a spraying device (not shown) is provided. The spraying device jets sprayed water to the inside of the agricultural greenhouse 30 and thus cools the inside of the agricultural greenhouse. In a case where the inside is cooled by such a spraying device, a ventilation device is typically provided in the agricultural greenhouse. This is because dew condensation occurs on the inner wall of the agricultural greenhouse by water supply from the spraying device and thus the amount of light incident to the agricultural greenhouse is reduced due to water droplets produced by the dew condensation, or the water droplets fall to plants to damage the plants. As the ventilation device, for example, a suction fan which introduces external air into agricultural greenhouse 30 and an exhaust fan which exhausts the internal atmosphere to the outside may be used (for example, refer to JP2014-198035A).

However, the antifogging film 10 has moisture permeability. Therefore, the ventilation device may be provided in the agricultural greenhouse 30. However, the ventilation device is not necessarily provided in the agricultural greenhouse and in the embodiment, the ventilation device is also not provided. Since the antifogging film 10 is used as a film for an agricultural greenhouse, the agricultural greenhouse 30 has the spraying device and the occurrence of dew condensation is suppressed without providing the ventilation device. Therefore, a reduction in the amount of light incident to the agricultural greenhouse 30 due to water droplets produced by dew condensation, and/or damage to plants caused by falling of the water droplets to the plants is suppressed. In the embodiment, the spraying device is provided in the agricultural greenhouse 30 as described above but the spraying device may not be provided.

Figure 6:
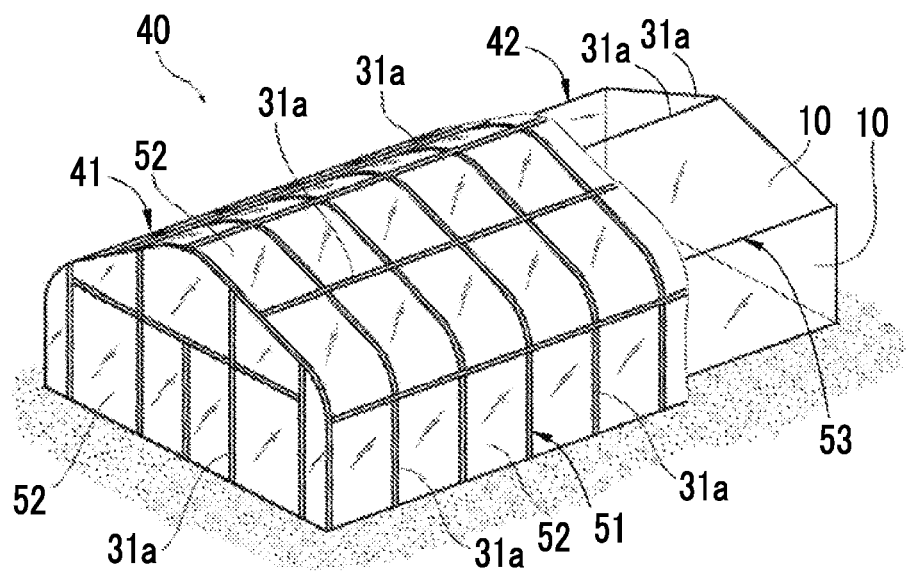
FIG. 6 is a schematic view of an agricultural greenhouse.

The antifogging film 10 can be also used for an agricultural greenhouse having a double structure. In FIG. 6, the agricultural greenhouse 40 includes a first house portion 41 which forms a space partitioned from the outside and a second house portion 42 which is provided in a state in which a gap between the second house portion and the first house portion is formed on the inside of the first house portion. The first house portion 41 includes a first skeleton 51 and a polyethylene terephthalate film 52 as an outer film, and the second house portion 42 includes a second skeleton 53 and the antifogging film 10 as an inner film. The outer film and the inner film are films for an agricultural greenhouse.

In the first house portion 41, the ventilation device which replaces the inner atmosphere of the first house portion 41 with external air may be provided. In addition, the outer film is not limited to the polyethylene terephthalate film and may be, for example, a polybutylene terephthalate film, a polycarbonate film, a polyethylene film, an acrylic resin film, a polyvinyl chloride film, a polyvinyl alcohol film, a cellulose acylate film, a fluororesin film or the like.

The first skeleton 51 and the second skeleton 53 are formed by combining the plurality of aggregates 31a, similar to the skeleton 31. In the example, the first skeleton 51 and the second skeleton 53 are different from each other in that both the number of aggregates 31a and the aspect of combination, but may be the same. The shape of each of the first skeleton 51 and the second skeleton 53 is not particularly limited similar to the shape of the skeleton 31. In addition, the first skeleton 51 and the second skeleton 53 are different in size in the example, but may be the same in shape. However, the shapes of the first skeleton 51 and the second skeleton 53 may be different from each other. For example, in the example, the roof portions of the first skeleton 51 and the second skeleton 53 are formed in a mountain shape. However, the roof portion of the first skeleton 51 is formed in a mountain shape and the roof portion of the second skeleton 53 may be flat-shaped in the horizontal direction.

Similar to the antifogging film 10 in the agricultural greenhouse 30, the polyethylene terephthalate film 52 is spread on the first skeleton 51 and the antifogging film 10 is spread on the second skeleton 53. The agricultural greenhouse 40 includes the same spraying device (not shown) as in the agricultural greenhouse 30 provided in the second house portion 42 and the ventilation device is not provided in the second house portion 42. Since the antifogging film 10 has moisture permeability, the occurrence of dew condensation is suppressed. The spraying device may not be provided. In addition, the ventilation device may be provided but as described above, the ventilation device is not necessarily provided.

In the agricultural greenhouse 30 and the agricultural greenhouse 40, the antifogging film 10 is used independently but may be used as a film for an agricultural greenhouse in a state in which the antifogging film and another film are laminated. That is, the film for an agricultural greenhouse may have the antifogging film 10 and specifically, there are a case where the film for an agricultural greenhouse is constituted of only the antifogging film 10, and a case where the film for an agricultural greenhouse is constituted of the antifogging film 10 and other films which are to be laminated. The film for an agricultural greenhouse in a state in which the antifogging film 10 and another film are laminated is used in a state in which the second base surface 11b of the antifogging film 10 and another film are closely attached to each other and the first film surface 10a of the antifogging film 10 is directed to the inner side of the agricultural greenhouse.

Another film to be laminated is not limited to a cellulose acylate film and a polyethylene terephthalate film, and examples thereof include a polybutylene terephthalate film, a polycarbonate film, a polyethylene film, an acrylic resin film, a polyvinyl chloride film, a polyvinyl alcohol film, and a fluororesin film. However, from the viewpoint of moisture permeability, a cellulose acylate film is most preferable. In a case of using a film for an agricultural greenhouse in a state in which a cellulose acylate film and the antifogging film 10 are laminated, the thickness of the film for an agricultural greenhouse in the laminated state is preferably in a range of 60 μm or more and 200 μm or less. Accordingly, in a case of using the film in the laminated state, the thickness T10 of the antifogging film 10 is smaller than the thickness of the antifogging film 10 used for the agricultural greenhouse 30 and the agricultural greenhouse 40 by the thickness of the cellulose acylate to be laminated.

EXAMPLES

Example 1 to Example 6

A cellulose acylate film was formed from a dope by a solution film formation method. The dope was prepared by putting a composition having the following formulation into an airtight container and while keeping the temperature at 40° C. under atmospheric pressure, stirring the composition to completely dissolve the composition. The material for TAC is linter. The acyl group substitution degree of TAC is 2.86 and the viscosity average polymerization degree is 320. Fine particles are R972 (manufactured by NIPPON AEROSIL CO., LTD.). The fine particles were dispersed in a solution obtained by dissolving TAC in a solvent as a mixture of dichloromethane and methanol by premixing. Then, the dispersion liquid was put into the airtight container to form a composition having the following formulation. After the composition was left to stand, the solution was filtered using a paper filter (No. 63, manufactured by Toyo Roshi Kaisha, Ltd.) in a state in which the temperature was kept at 30° C. and subjected to a defoaming operation. Then, a dope was obtained.

| TAC | 100 parts by mass |
| Dichloromethane | 635 parts by mass |
| Methanol | 125 parts by mass |
| Plasticizer | 15 parts by mass |
| Fine particles | 1.3 parts by mass |

For the plasticizer, an ester oligomer obtained from adipic acid and ethanediol was used as ester. Regarding the molecular weight of the ester oligomer, the number average molecular weight obtained by a method for quantitative determination of terminal hydroxyl groups was about 1,000. In a case of using the plasticizer, "A" is put in the column of "Plasticizer" in Table 1.

The dope whose temperature was adjusted to 30° C. was cast on the support. The support is an endless belt formed of stainless steel. The cast film was exposed to hot air at 100° C. immediately after the film was formed and was dried. After 120 seconds had elapsed from the film formation, the cast film was peeled off from the support at a peeling tension of 150 N/m to form a cellulose acylate film. The temperature of the support at the peeling position was set to 10° C. The amount of the remaining solvent of the cast film at the time of peeling-off was 100% by mass.

The peeled-off cellulose acylate film was dried while the film was being transported by a large number of rolls arranged in a transport path in a state in which the tension in the longitudinal direction was set to 100 N/m. Drying was performed by transporting the film in a first drying zone whose temperature was set to 80° C. for 5 minutes and then further transporting the film in a second drying zone whose temperature was set to 120° C. for 10 minutes. After drying, the cellulose acylate film was wound in a roll shape and thus a film roll was obtained. The width of the cellulose acylate film was 1.5 m and the winding length of the film roll was 2,000 m. The amount of the remaining solvent of the cellulose acylate film at the time of winding was 0.3%.

The obtained cellulose acylate film was saponified to produce 6 kinds of antifogging films 10. These obtained films were used for Examples 1 to 6. The treatment time and the treatment temperature of saponification were appropriately changed. Specifically, each antifogging film 10 was produced in the following manner. The cellulose acylate film was unwound from the film roll and transported. A saponification liquid was applied to one film surface of the cellulose acylate film by a coating device provided on the transport path. The formulation of the saponification liquid is as follows. In the following formulation, % is a mass percentage.

| | | |
|---|---|---|
| Potassium hydroxide (KOH) | | 3.3% |
| Isopropyl alcohol | | 88% |
| Water | | 3% |
| Propylene glycol | | 5% |
| Surfactant | | 0.04% |

The cellulose acylate film to which the saponification liquid was applied was guided to a heating chamber provided on the transport path and heated while the film was being transported. Then, the film was fed to a water tank storing water and washed with water. Regarding each of the long antifogging films 10 obtained as described above, the thickness T10, the contact angle after 15 seconds, and the acyl group ratio were respectively obtained. The methods of obtaining the contact angle after 15 seconds and the acyl group ratio are as described above. The thickness T10 is an average value of values measured at an interval of 0.5 mm in the width direction using a contact type thickness meter. These results are shown in Table 1.

Regarding each of the obtained antifogging films 10, initial antifogging properties, long-term antifogging properties, and handleability were evaluated based on the following standards in the following manner. In addition, the workability in a case where each of the antifogging films 10 obtained in Examples 4 and 5 was used for the agricultural greenhouse 30 and the agricultural greenhouse 40, and the light transmittance under the occurrence of dew condensation were evaluated based on the following standards in the following manner. Each evaluation result is shown in Table 1.

(1) Initial Antifogging Properties

The antifogging film 10 was attached to a glass plate cooled to a temperature in a range of 10° C. or higher and 15° C. or lower and fogging was evaluated in a room at 25° C. and a relative humidity of 60%. Based on the time from attachment of the entire antifogging film 10 to the glass plate using a colorless transparent sheet type double-sided adhesive tape to fogging of the film, evaluation was performed based on the following standards. The method of attaching the antifogging film 10 to the glass plate is not limited to using a double-sided adhesive tape. For example, using a method of applying a pressure sensitive adhesive to any one of the glass plate and the antifogging film 10, the antifogging film 10 may be attached to the glass plate. A state in which an object was not visible through the glass plate was determined as fogging. A and B are pass levels and C and D are fail levels.

A: 10 minutes or longer
B: 5 minutes or longer and shorter than 10 minutes
C: 1 minute or longer and shorter than 5 minutes
D: shorter than 1 minute (2) Long-Term Antifogging Properties The door of a refrigerator was changed to glass and the antifogging film 10 was attached to the surface of the glass. The environment in the room where the refrigerator was placed was maintained at 25° C. and a relative humidity of 60%. The antifogging film after 2 hours had elapsed from the attachment was visually observed and evaluated based on the following standards. A is a pass level, and B and C are fail levels.

A: Water droplets were not observed on the antifogging film.
B: While the inside of the refrigerator was visible, water droplets were observed on the antifogging film 10.
C: The inside of the refrigerator was not visible due to fogging.

(3) Handleability

Glass was used as an attaching target and the antifogging film 10 having a size of 1 m×1 m was attached to the glass. Immediately after the attachment, the antifogging film was reattached and the attachment in a case of reattachment was evaluated based on the following standards. The evaluated results were used for evaluation of handleability. A and B are pass levels and C is a fail level.

A: In a state in which the antifogging film was closely attached to the glass, the film was able to be attached without any problem.
B: While the antifogging film was slightly floated from the glass, the film was attachable.
C: The antifogging film was fractured or was considerably floated from the glass and thus was not attachable due to these problems.

(4) Workability in Case of Using Antifogging Film for Agricultural Greenhouse 30 and Second House Portion 42 of Agricultural Greenhouse 40

The workability in a case where the antifogging film 10 was used for the agricultural greenhouse 30 and the agricultural greenhouse 40 was evaluated based on the following standards in the following manner. The size of the formed agricultural greenhouse is such that the length in a first horizontal direction is 6 m, the length in a second horizontal direction orthogonal to the first direction is 9 m, and the height is 4 m. A and B are pass levels as practically usable levels, and C is a fail level as a practically unusable level. The results are shown in the column "Agricultural workability" in Table 1.

A: The antifogging film was worked without fracturing and as a result, an agricultural greenhouse was obtained.
B: While the antifogging film was slightly fractured at one or two places, the film was worked without any practical problem and as a result, an agricultural greenhouse was obtained.
C: Significant fracturing occurred in the antifogging film and an agricultural greenhouse was not obtained.

(5) Light Transmittance Under Occurrence of Dew Condensation

The antifogging film 10 was attached to the upper portion of a cube formed of an aluminum frame material of 30 cm square and a black cloth was attached to the side surface. The cube was placed under sunlight and a detection portion of a spectral spectrum intensity measuring device (Spectrometer SE-PS300 manufactured by SENECOM CORPORATION) for measuring the transmittance of light having a wavelength range of 300 nm or more and 700 nm or less was disposed in the cube. Then, water droplets were forcibly attached to the antifogging film 10 by spraying from the outside of the cube. In a case of using the antifogging film 10 before the water droplets were attached thereto, that is, in a dried state, the transmittance (unit: %) of light having the above wavelength range was obtained for each wavelength region of 0.5 nm. These values were set to ta1, ta2, ta3, . . . , and ta800. In the same manner, in a state in which water droplets were attached to the film, the transmittance (unit: %) of light having the above wavelength range was obtained for each wavelength region of 0.5 nm. These values were set to tb1, tb2, tb3, . . . , and tb800. Next, for each wavelength region of 0.5 nm, values of tb1/ta1, tb2/ta2, tb3/ta3, . . . , and tb800/ta800 were respectively obtained by dividing the transmittances in a state in which water droplets were attached to the film by the transmittances in a dried state, and the average value of these 800 numerical values was obtained as the transmittance of light under the occurrence of dew condensation. The results are shown in the column of "Light transmittance" in Table 1.

Comparative Example 1 to Comparative Example 8

The presence or absence of the saponified layer, the formation method of the saponified layer, the kind of plasticizer, and the like were changed to produce 8 kinds of antifogging films. These obtained films were used for Comparative Examples 1 to 8. The presence or absence of the saponified layer, the formation method of the saponified layer, and the like are shown in Table 1. "Immersion" in the column of "Formation method" of "Saponified layer" in Table 1 refers to a case where the cellulose acylate film is immersed in the saponification liquid stored in the container to coat the cellulose acylate film with the saponification liquid. "B" in the column of "Plasticizer" in Table 1 means that triphenyl phosphate (molecular weight: 325) is used as the plasticizer. Other conditions are the same as in examples.

Regarding the obtained antifogging films, the thickness T10, the contact angle after 15 seconds, and the acyl group ratio were respectively obtained and initial antifogging properties, long-term antifogging properties, and handleability were evaluated based on the same standards in the same manner as in examples. In addition, regarding the antifogging films obtained in Comparative Examples 1 and 8, the workability in a case of using the antifogging films for the agricultural greenhouse 30 and the agricultural greenhouse 40 and the transmittance of light under the occurrence of dew condensation were evaluated based on the same standards in the same manner as in Examples 4 and 5. These results are shown in Table 1.

What is claimed is:

1. An antifogging film comprising:
 a film base which is formed of cellulose acylate; and
 a saponified layer which is provided on one base surface of the film base, serves as one film surface, and contains saponified cellulose acylate,
 wherein a contact angle 15 seconds after dropping of pure water to the one film surface is 20° or less, and in a case where an amount of acyl groups of the one film surface is X and an amount of acyl groups of the other base surface of the film base is Y, an acyl group ratio obtained by X/Y is 0.7 or less.

2. The antifogging film according to claim 1,
 wherein the amount of acyl groups X and the amount of acyl groups Y are obtained as acyl group spectrum

TABLE 1

| | Saponified layer | | | Contact angle after 15 seconds (°) | Acyl group ratio X/Y | Plasticizer | Evaluation result | | | | |
|---|---|---|---|---|---|---|---|---|---|---|---|
| | Thickness T10 (μm) | Presence or absence | Formation method | | | | Antifogging properties | | | Workability for agricultural use | Light transmittance |
| | | | | | | | Initial | Long-term | Handleability | | |
| Example 1 | 40 | Presence | Coating | 20 | 0.65 | A | B | A | A | | |
| Example 2 | 40 | Presence | Coating | 15 | 0.5 | A | B | A | A | | |
| Example 3 | 40 | Presence | Coating | 16 | 0.65 | A | B | A | A | | |
| Example 4 | 40 | Presence | Coating | 13 | 0.3 | A | A | A | A | B | 0.98 |
| Example 5 | 120 | Presence | Coating | 14 | 0.6 | — | B | A | B | A | 0.96 |
| Example 6 | 120 | Presence | Coating | 20 | 0.7 | — | B | A | B | | |
| Comparative Example 1 | 40 | Absence | — | 60 | 1 | A | D | C | A | B | 0.85 |
| Comparative Example 2 | 40 | Presence | Coating | 30 | 0.8 | A | C | B | A | | |
| Comparative Example 3 | 40 | Presence | Coating | 25 | 0.75 | A | C | B | A | | |
| Comparative Example 4 | 80 | Presence | Coating | 45 | 0.9 | B | C | B | A | | |
| Comparative Example 5 | 80 | Presence | Coating | 35 | 0.75 | B | C | B | A | | |
| Comparative Example 6 | 80 | Presence | Immersion | 65 | 0 | B | A | C | A | | |
| Comparative Example 7 | 40 | Presence | Immersion | 55 | 0 | A | A | B | A | | |
| Comparative Example 8 | 120 | Absence | — | 60 | 1 | — | D | C | B | A | 0.86 | intensities obtained by an attenuated total reflection measurement method of Fourier transform infrared spectroscopy.

3. The antifogging film according to claim 1,
wherein the contact angle is obtained by dropping the pure water to the one film surface after adjusting humidity of the saponified layer in an atmosphere at a temperature in a range of 23° C. or higher and 28° C. or lower and a relative humidity in a range of 55% or more and 65% or less.

4. The antifogging film according to claim 1,
wherein a mass of a plasticizer having a molecular weight of less than 500 in the film base is at most 4% with respect to a mass of cellulose acylate.

5. The antifogging film according to claim 1,
wherein the film base includes an ester oligomer having a repeating unit including an ester bond of dicarboxylic acid and diol and having a molecular weight in a range of 500 or more and 10,000 or less, as a plasticizer.

6. The antifogging film according to claim 5,
wherein the dicarboxylic acid is an aliphatic dicarboxylic acid having 2 to 10 carbon atoms, and the diol is an aliphatic diol having 2 to 10 carbon atoms.

7. The antifogging film according to claim 1,
wherein a thickness of the saponified layer is in a range of 1 μm or more and 6 μm or less.

8. The antifogging film according to claim 1,
wherein an amount of C=O groups of acyl groups in a depth range of 2 μm from the one film surface is 70% or less with respect to an amount of C=O groups of acyl groups in the other base surface of the film base.

9. The antifogging film according to claim 1,
wherein the saponified layer is a layer formed by subjecting a cellulose acylate film to a saponification treatment, and
the film base is a remaining portion of the cellulose acylate film excluding the saponified layer.

* * * * *